(12) United States Patent
Umezaki et al.

(10) Patent No.: US 12,179,639 B2
(45) Date of Patent: Dec. 31, 2024

(54) SEAT SLIDING DEVICE AND SLIDE LEVER CONNECTING STRUCTURE IN THE SEAT SLIDING DEVICE

(71) Applicant: DELTA KOGYO CO., LTD., Aki-gun (JP)

(72) Inventors: Kiyonori Umezaki, Aki-gun (JP); Kenta Tsuchiya, Aki-gun (JP)

(73) Assignee: DELTA KOGYO CO., LTD., Aki-gun (JP)

( * ) Notice: Subject to any disclaimer, the term of this patent is extended or adjusted under 35 U.S.C. 154(b) by 349 days.

(21) Appl. No.: 17/630,458

(22) PCT Filed: Jul. 31, 2020

(86) PCT No.: PCT/JP2020/029545
§ 371 (c)(1),
(2) Date: Jan. 26, 2022

(87) PCT Pub. No.: WO2021/020579
PCT Pub. Date: Feb. 4, 2021

(65) Prior Publication Data
US 2022/0250512 A1 Aug. 11, 2022

(30) Foreign Application Priority Data
Jul. 31, 2019 (JP) .................. 2019-141842

(51) Int. Cl.
*B60N 2/08* (2006.01)
(52) U.S. Cl.
CPC .................. *B60N 2/08* (2013.01)
(58) Field of Classification Search
CPC ...... B60N 2/08; B60N 2/0705; B60N 2/0818; B60N 2/085
(Continued)

(56) References Cited

U.S. PATENT DOCUMENTS 6,007,040 A * 12/1999 Matsumoto .......... B60N 2/0818
248/429
10,160,351 B2 * 12/2018 Sugimoto .............. B60N 2/123
(Continued)

FOREIGN PATENT DOCUMENTS

| JP | 2001-219768 A | 8/2001 |
| JP | 2012-25243 A | 2/2012 |

(Continued)

OTHER PUBLICATIONS

International Search Report issued on Oct. 13, 2020 in PCT/JP2020/029545 filed on Jul. 31, 2020, 2 pages.

*Primary Examiner* — Pinel E Romain
(74) *Attorney, Agent, or Firm* — Oblon, McClelland, Maier & Neustadt, L.L.P.

(57) ABSTRACT

A connecting end part of a slide lever has a tubular shape, and a front end part of a release lever is inserted in the connecting end part with a connection spring member therebetween. The connection spring member has a bent end located forward and wire parts extending rearward from the bent end. Protruding engagement parts are formed in the wire parts. The wire parts are placed inside the front end part, and the protruding engagement parts are made to protrude from engagement protrusion holes of the release lever, and then the tubular connecting end part of the slide lever is fitted on the outer side of the front end part. The protruding engagement parts engage with engagement holes of the slide lever, and its front lock part presses the inner surface of the connecting end part.

4 Claims, 7 Drawing Sheets

(58) Field of Classification Search
USPC .......................................... 296/65.13, 65.03
See application file for complete search history.

(56) References Cited

U.S. PATENT DOCUMENTS

| | | | |
|---|---|---|---|
| 2012/0001049 A1* | 1/2012 | Selbold | B60N 2/085 |
| | | | 403/83 |
| 2013/0134281 A1 | 5/2013 | Naoki | |
| 2013/0168524 A1 | 7/2013 | Aoi | |
| 2014/0042289 A1* | 2/2014 | Kawano | B60N 2/0705 |
| | | | 248/429 |
| 2016/0221476 A1* | 8/2016 | Satoh | B60N 2/0715 |
| 2017/0036568 A1* | 2/2017 | Kumagai | B60N 2/0806 |

FOREIGN PATENT DOCUMENTS

| | | |
|---|---|---|
| JP | 2012-56379 A | 3/2012 |
| JP | 2018-52401 A | 4/2018 |
| WO | WO-2014057818 A1 * 4/2014 | ........... B60N 2/0705 |

\* cited by examiner (a)

(b)

SEAT SLIDING DEVICE AND SLIDE LEVER CONNECTING STRUCTURE IN THE SEAT SLIDING DEVICE

TECHNICAL FIELD

The present invention relates to a seat sliding device used in seats of vehicles such as automobiles, airplanes, trains, ships, and buses and a slide lever connecting structure in the seat sliding device.

BACKGROUND ART

A seat sliding device includes: a lower rail attached to the floor of a vehicle; an upper rail slidably provided on the lower rail and connected to a seat frame; and a pair of left and right seat slide adjusters each having a locking mechanism for fixing the front and rear sliding positions of the upper rail. The locking mechanisms each include: a lock plate having engagement holes or the like which engage with teeth formed in the lower rail; a locking spring member which biases the lock plate in an engagement direction; and a release lever which is linked to the lock plate to operate the lock plate in a disengagement direction against the elastic force of the locking spring member. The seat sliding device further includes a slide lever connecting the release levers of the pair of left and right seat slide adjusters and operated by a person.

A conventional method often employed to connect a slide lever to a release lever is rivet caulking, but a specialized tool is required for caulking the rivet, or a backlash may occur at a fastened part. Further, when a lock plate is locked to teeth of a lower rail, a slight impact occurs, and because of the impact, the fastened part, if having the backlash, may slightly rattle to generate abnormal noise. As a solution to this, Patent Document 1 has proposed an art to connect them with a tubular spring having inwardly raised pieces and outwardly raised pieces therebetween.

PRIOR ART DOCUMENT

Patent Document

Patent Document 1: Japanese Patent Application Laid-open No. 2001-219769

SUMMARY OF THE INVENTION

Problems to Be Solved by the Invention

The art of Patent Document 1 is advantageous in that the slide lever is easily attached to the release lever and the elasticity of the tubular spring reduces the rattling of the connection part. However, in the state of being interposed between the slide lever and the release lever, the tubular spring is integrated with the inner surface of the slide lever and the elasticity of a tubular main body of the tubular spring does not act much, and the elasticity of the inwardly raised pieces and the outwardly raised pieces protruding from the tubular main body mainly acts. That is, the elasticity corresponding to the protrusion length of these raised pieces from the tubular main body acts, but because of the short protrusion length, a spring constant is high, and there is still room for improvement in the effect of reducing the rattling between the slide lever and the release lever.

The present invention was made in consideration of the above and has an object to provide a seat sliding device whose slide lever and release lever can be easily connected and that has less rattling therebetween and generates less abnormal noise, and a slide lever connecting structure in the seat sliding device.

Means for Solving the Problems

To solve the aforesaid problem, a seat sliding device of the present invention includes:
a lower rail;
an upper rail slidably provided on the lower rail and connected to a seat frame;
a locking mechanism including a lock plate for locking the upper rail at a predetermined position of the lower rail, a locking spring member which biases the lock plate in a locking direction, and a release lever which operates the lock plate in an unlocking direction; and
a slide lever for operation connected to a front end part of the release lever,
wherein the slide lever has a connecting end part in a tubular shape, and the front end part of the release lever is inserted in the connecting end part with a connection spring member therebetween,
wherein the connection spring member is formed of a worked wire material for springs, is bent in the middle, and includes:
a bent end located forward;
two wire parts extending rearward from the bent end and biased in such a direction as to separate from each other;
protruding engagement parts which are formed to protrude outward in the respective two wire parts at positions a predetermined distance apart from the bent end and, in a state in which the two wire parts are inserted in the front end part of the release lever, protrude outward from engagement protrusion holes formed in the front end part at opposed positions; and
a front lock part provided on the bent end side and having an acting end biased in such a direction as to be apart from the two wire parts, and
wherein the connecting end part of the slide lever has engagement holes formed at opposed positions, and is fitted on an outer side of the front end part of the release lever while the protruding engagement parts of the connection spring member protruding from the engagement protrusion holes of the front end part of the release lever engage with the engagement holes and an inner surface of the connecting end part is pressed by elastic force of the acting end of the front lock part of the connection spring member.

A slide lever connecting structure of the present invention is a slide lever connecting structure for connecting a slide lever to a release lever in a seat sliding device, the seat sliding device including: a lower rail; an upper rail slidably provided on the lower rail and connected to a seat frame; a locking mechanism including a lock plate for locking the upper rail at a predetermined position of the lower rail, a locking spring member which biases the lock plate in a locking direction, and the release lever which operates the lock plate in an unlocking direction; and the slide lever for operation connected to a front end part of the release lever,
wherein the slide lever has a connecting end part in a tubular shape, and the front end part of the release lever is inserted in the connecting end part with a connection spring member therebetween, wherein the connection spring member is formed of a worked wire material for springs, is bent in the middle, and includes:

a bent end located forward;

two wire parts extending rearward from the bent end and biased in such a direction as to separate from each other;

protruding engagement parts which are formed to protrude outward in the respective two wire parts at positions a predetermined distance apart from the bent end and, in a state in which the two wire parts are inserted in the front end part of the release lever, protrude outward from engagement protrusion holes formed in the front end part at opposed positions; and a front lock part provided on the bent end side and having an acting end biased in such a direction as to be apart from the two wire parts, and wherein the connecting end part of the slide lever has engagement holes formed at opposed positions, and is fitted on an outer side of the front end part of the release lever while the protruding engagement parts of the connection spring member protruding from the engagement protrusion holes of the front end part of the release lever engage with the engagement holes and an inner surface of the connecting end part is pressed by elastic force of the acting end of the front lock part of the connection spring member.

Preferably, the front lock part has a substantially rectangular shape whose sides include the bent end and whose side opposite the bent end is the acting end, and is more apart from the two wire parts as the front lock part goes from the bent end toward the acting end.

Effect of the Invention

According to the present invention, the connecting end part of the slide lever has a tubular shape and the front end part of the release lever is inserted in the connecting end part with the connection spring member therebetween. The connection spring member is formed of a worked wire for springs and has the bent end located forward and the wire parts extending rearward from the bent end. The protruding engagement parts are formed in the wire parts. In the state in which the wire parts are placed inside the front end part of the release lever with the protruding engagement parts protruding from the engagement protrusion holes of the release lever in advance, the tubular connecting end part of the slide lever is fitted on the outer side of the release lever. The connection can be easily done by the protruding engagement parts of the connection spring member engaging with the engagement holes of the slide lever. Further, the protruding engagement parts engage with both the engagement protrusion holes of the release lever and the engagement holes of the slide lever, and the front lock part including the bent end located forward is locked with its acting end pressing the inner surface of the connecting end part of the slide lever. This enables the easy and sure connection of the slide lever and the release lever.

Further, the entire connection spring member is formed of the wire material for springs, and the wire parts between the protruding engagement parts and the front lock part are not fixed to the inner surface of the slide lever. Therefore, elasticity corresponding to the length from the protruding engagement parts to the bent end is exhibited. If the wire parts between the protruding engagement parts and the front lock part are fixed to some place, the spring constant becomes high because actually functioning elasticity corresponds to that of a spring shorter than the length of the wire parts, but in the connecting structure of the present invention, this does not occur, and the elasticity of the connection spring member functions with the spring constant corresponding to the length of the wire parts between the protruding engagement parts and the front lock part. This makes it possible not only to easily and surely connect the slide lever and the release lever with less rattling therebetween but also to absorb even a slight impact occurring at the locking operation time of the lock plate, achieving a higher effect of reducing the generation of abnormal noise.

MODES FOR CARRYING OUT THE INVENTION

Figure 1:
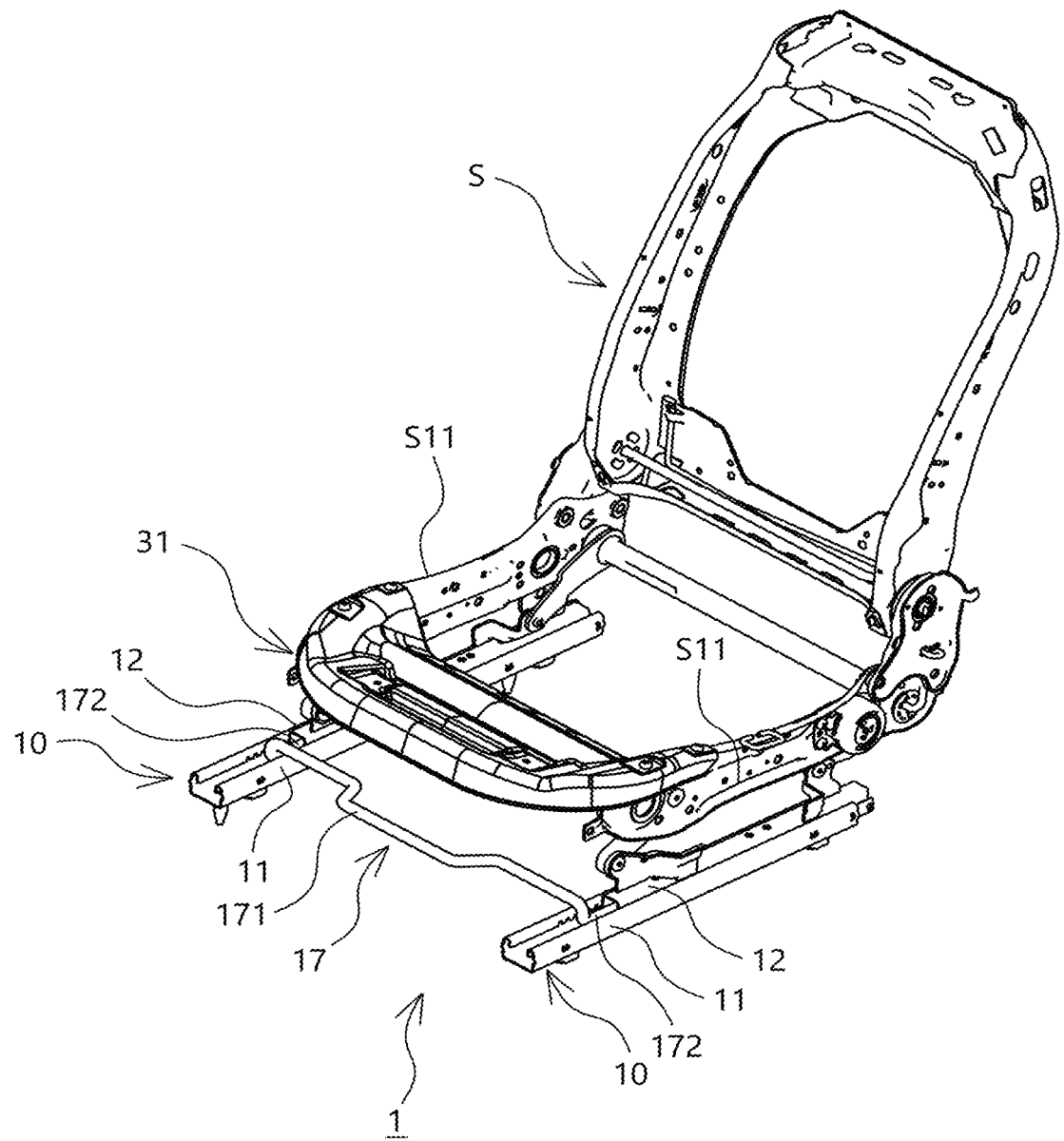
FIG. 1 is a perspective view illustrating a state in which a seat sliding device according to one embodiment of the present invention supports a seat frame.

The present invention will be hereinafter described in more detail based on an embodiment illustrated in the drawings. As illustrated in FIG. 1, a seat frame S is provided such that its forward and rearward sliding can be adjusted by a pair of left and right seat sliding devices 1 of this embodiment that are a predetermined interval apart from each other in the width direction of the vehicle body. A slide lever 17 extending between left and right seat slide adjusters 10, 10 included in the seat sliding device 1 is provided below a front edge of a seat cushion frame S1. The slide lever 17 connects later-described release levers 161, 161 of locking mechanisms 16, 16 provided in the left and right seat slide adjusters 10, 10, and the locking is released when the slide lever 17 is operated by a person.

Figure 2:
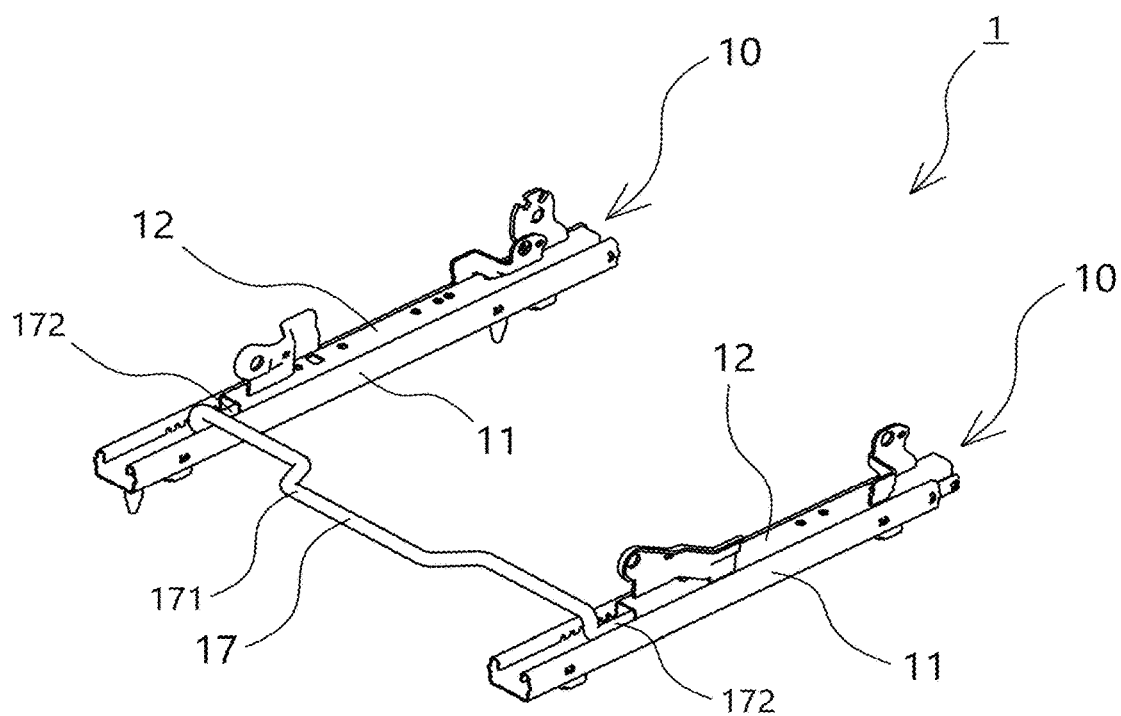
FIG. 2 is a perspective view of the seat sliding device in FIG. 1.
Figure 3:
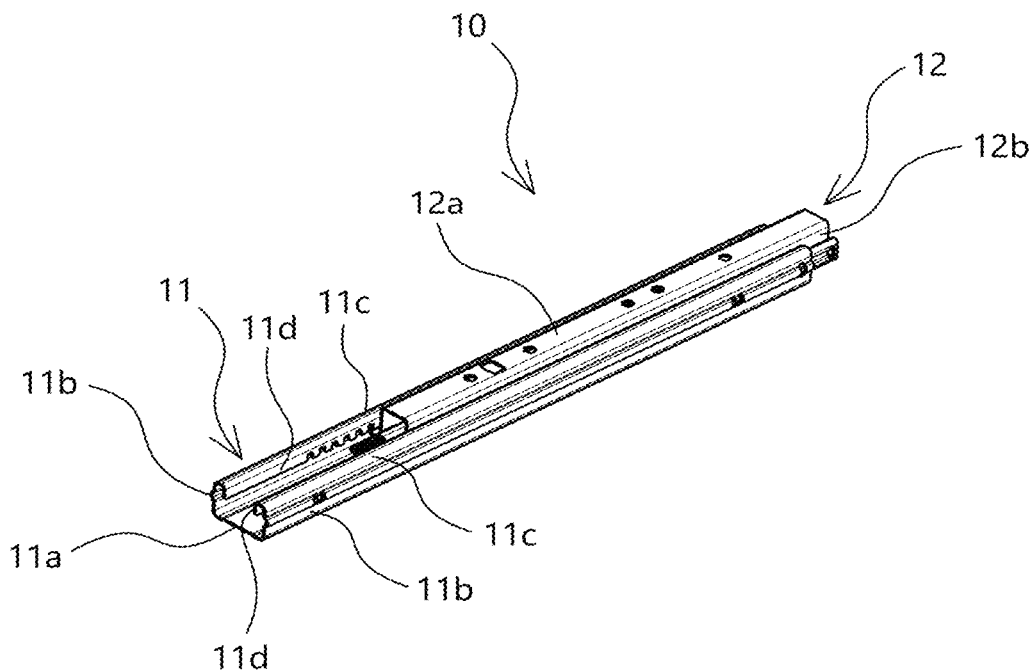
FIG. 3 is a perspective view of one of seat slide adjusters in the seat sliding device in FIG. 1 and FIG. 2.

In the following, with reference to mainly FIG. 3 to FIG. 6 which illustrate only one of the seat slide adjusters 10, 10, its detailed structure will be described, but the left and right seat slide adjusters 10, 10 illustrated in FIG. 1 and FIG. 2 have the same structure.

The seat slide adjuster 10 included in the seat sliding device 1 of this embodiment includes a lower rail 11 and an upper rail 12 slidable in the longitudinal direction of the lower rail 11. The lower rail 11 is fixed to the vehicle body floor and the upper rail 12 is connected to a side frame S11 of the seat cushion frame S1 of the seat frame S.

The lower rail 11 has a bottom wall 11a, a pair of vertical walls 11b, 11b rising from both sides of the bottom wall 11a to face each other, a pair of upper walls 11c, 11c which are bent inward from upper edges of the vertical walls 11b, 11b and whose facing edges are a predetermined distance apart from each other, and inner walls 11d, 11d bent downward from inner edges of the upper walls 11c, 11c. The lower rail 11 has a substantially C-shape with its upper surface being open in the widthwise cross section orthogonal to the longitudinal direction (see FIG. 3 and FIG. 4).

The upper rail 12 has an upper wall 12a and a pair of sidewalls 12b, 12b bent downward from both sides of the upper wall 12a to face each other, and has a substantially C-shaped widthwise cross section with its lower surface being open. The upper rail 12 further has: bottom walls 12c, 12c with a predetermined width bent outward in a substantially horizontal direction from lower ends of the sidewalls 12b, 12b; and vertical walls 12d, 12d bent upward from outer edges of the bottom walls 12c, 12c (see FIG. 4). The vertical walls 12d, 12d of the upper rail 12 are located between the vertical walls 11b, 11b and the inner walls 11d, 11d of the lower rail 11 to face the vertical walls 11b, 11b of the lower rail 11.

Figure 4:
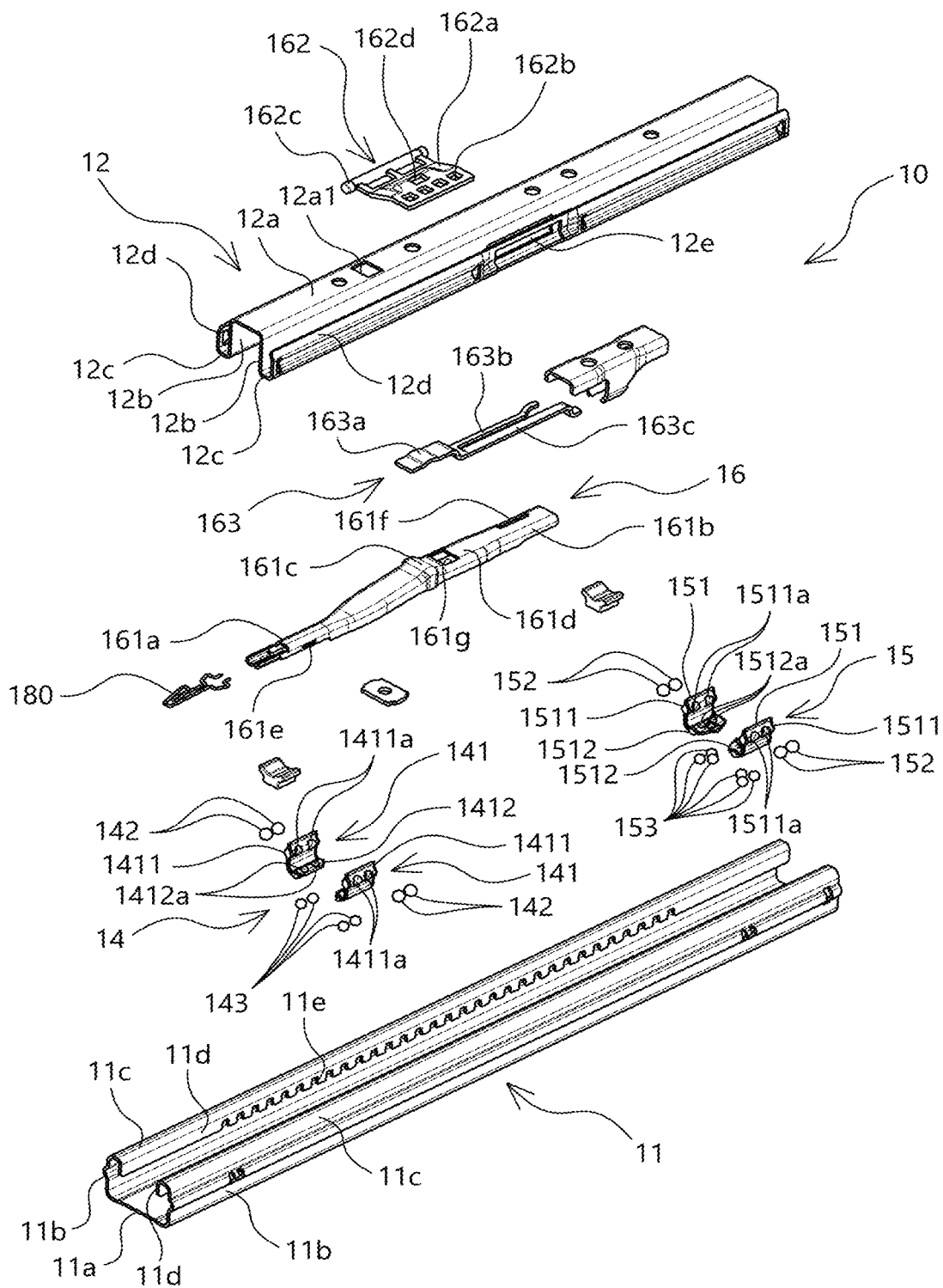
FIG. 4 is an exploded perspective view of the seat slide adjuster in FIG. 3.
Figure 5:
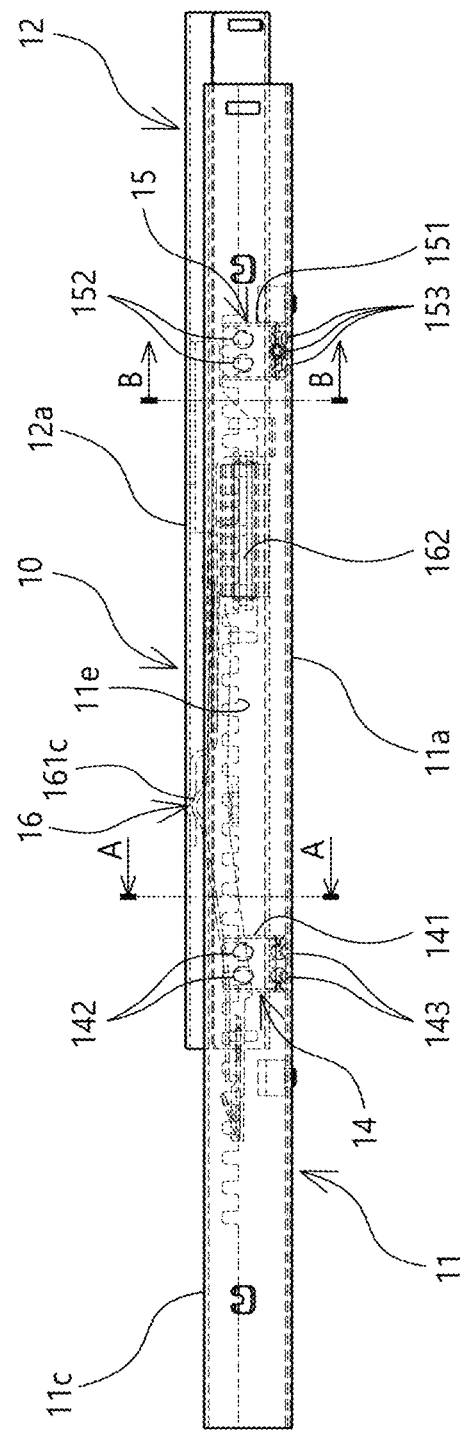
FIG. 5 is a side view of the seat slide adjuster in FIG. 4.

Between the lower rail 11 and the upper rail 12, sliding resistance reducing members 14, 15 are provided as illustrated in FIG. 4 and FIG. 5. Preferably, the plurality of sliding resistance reducing members 14, 15 are arranged at a predetermined interval in the longitudinal direction of the lower rail 11, and in this embodiment, the sliding resistance reducing members 14, 15 are provided in the vicinity of the front and the rear of the lower rail 11 respectively.

The sliding resistance reducing members 14, 14 disposed in the vicinity of the front (hereinafter, referred to as "front sliding resistance reducing members") substantially face each other across the widthwise middle of the lower rail 11 and they are provided in pair so as to correspond respectively to the left and right vertical walls 11b, 11b of the lower rail 11. Specifically, the front sliding resistance reducing members 14, 14 include retainers (front retainers) 141, 141 having a substantially L-shaped widthwise cross section and having a several cm length along the longitudinal direction of the lower rail 11. The front retainers 141, 141 having the substantially L-shaped cross section include first retaining walls 1411, 1411 extending in the vertical direction and second retaining walls 1412, 1412 extending in the lateral direction from lower ends of the first retaining walls 1411, 1411 toward the widthwise middle of the lower rail 11. Preferably, the front sliding resistance reducing members 14, 14 are formed of synthetic resin and have flexibility so that the first retaining walls 1411, 1411 are bendable relative to the second retaining walls 1412, 1412.

The front retainers 141, 141 are disposed with the first retaining walls 1411, 1411 located between the vertical walls 11b, 11b of the lower rail 11 and the vertical walls 12d, 12d of the upper rail 12 and with the second retaining walls 1412, 1412 located between the bottom wall 11a of the lower rail 11 and the bottom walls 12c, 12c of the upper rail 12.

The first retaining walls 1411, 1411 each have one or more ball member retaining parts 1411a, 1411a, and in this embodiment, they each have the ball member retaining parts 1411a, 1411a at two places along the longitudinal direction of the lower rail 11. In the ball member retaining parts 1411a, 1411a, first ball members 142, 142 are rotatably disposed.

The second retaining walls 1412, 1412 each also have one or more ball member retaining parts 1412a, 1412a. In this embodiment, the ball member retaining parts 1412a, 1412a are formed at two places along the longitudinal direction of the lower rail 11. In the ball member retaining parts 1412a, 1412a of the second retaining walls 1412, 1412, second ball members 143, 143 are rotatably disposed.

The sliding resistance reducing members 15, 15 disposed in the vicinity of the rear (hereinafter, "rear sliding resistance reducing members") also substantially face each other across the widthwise middle of the lower rail 11 and they are provided in pair to correspond respectively to the left and right vertical walls 11b, 11b of the lower rail 11, similarly to the front sliding resistance reducing members 14, 14 as illustrated in FIG. 4. The rear sliding resistance reducing members 15, 15, which have substantially the same structure as that of the front sliding resistance reducing members 14, 14, include retainers (rear retainers) 151, 151 having a substantially L-shaped widthwise cross section and having the same length as that of the front retainers 141, 141 along the longitudinal direction of the lower rail 11. The retainers 151, 151 include first retaining walls 1511, 1511 extending in the vertical direction and second retaining walls 1512, 1512 extending in the lateral direction from lower ends of the first retaining walls 1511, 1511 toward the widthwise middle Z of the lower rail 11. It is also preferable that the rear sliding resistance reducing members 15, 15 are formed of synthetic resin and have flexibility so that the first retaining walls 1511, 1511 are bendable relative to the second retaining walls 1512, 1512.

The rear retainers 151, 151 are also disposed with the first retaining walls 1511, 1511 located between the vertical walls 11b, 11b of the lower rail 11 and the vertical walls 12d, 12d of the upper rail 12 and with the second retaining walls 1512, 1512 located between the bottom wall 11a of the lower rail 11 and the bottom walls 12c, 12c of the upper rail 12.

The first retaining walls 1511, 1511 of the rear retainers 151, 151 each have one or more ball member retaining parts 1511a, 1511a, and in this embodiment, they each have the ball member retaining parts 1511a, 1511a at two places along the longitudinal direction of the lower rail 11. In the ball member retaining parts 1511a, 1511a, first ball members 152, 152 are rotatably disposed in contact with the vertical walls 11b, 11b of the lower rail 11 and the vertical walls 12d, 12d of the upper rail 12. Further, the second retaining walls 1512, 1512 each also have one or more ball member retaining parts 1512a, 1512a.

Note that the number of the ball member retaining parts 1512a, 1512a of the second retaining walls 1512, 1512 of the rear retainers 151, 151 is three in this embodiment as illustrated in FIG. 4. Specifically, the two ball member retaining parts 1512a, 1512a are arranged along the longitudinal direction of the lower rail 11 at positions a predetermined distance apart from the vertical walls 11b, 11b of the lower rail 11 toward the widthwise middle Z of the lower rail 11, and the one is formed still closer to the widthwise middle of the lower rail 11. Accordingly, the second retaining walls 1512, 1512 of the rear retainers 151, 151 are substantially triangular in a plan view and their apexes are directed toward the widthwise middle of the lower rail 11.

Further, the second ball members 153, 153 are disposed in the three ball member retaining parts 1512a, 1512a formed in each of the second retaining walls 1512, 1512, and the total number of the second ball members 153, 153 in each of the second retaining walls 1512, 1512 is three. A load applied to the seat slide adjuster 10 is larger in its rearward part than in its forward part by about 10 to 30%. Therefore, the number of the second ball members 153, 153 disposed in the second retaining walls 1512, 1512 of the rear retainers 151, 151 is preferably larger than the number of the second ball members 143, 143 disposed in the front retainers 141, 141.

The seat slide adjuster 10 of this embodiment has the aforesaid sliding resistance reducing members 14, 15. The front retainers 141, 141 and the rear retainers 151, 151 both have the substantially L-shaped cross section and have the first retaining walls 1411, 1411, 1511, 1511 in which the first ball members 142, 142, 152, 152 are disposed and the second retaining walls 1412, 1412, 1512, 1512 in which the second ball members 143, 143, 153, 153 are disposed. The second retaining walls 1412, 1412, 1512, 1512 are disposed between the bottom wall 11a of the lower rail 11 and the bottom walls 12c, 12c of the upper rail 12, and the first retaining walls 1411, 1411, 1511, 1511 are disposed between the vertical walls 11b, 11b of the lower rail 11 and the vertical walls 12d, 12d of the upper rail 12. In addition, the first ball members 142, 142, 152, 152 are supported at positions apart from both the upper walls 11c 11c and the bottom wall 11a of the lower rail 11 within a range of the vertical walls 11b, 11b of the lower rail 11, and the second ball members 143, 143, 153, 153 are supported at positions apart from the vertical walls 11b, 11b of the lower rail 11 toward the widthwise middle Z. That is, the first ball members 142, 142, 152, 152 are disposed not at positions where rigidity is high such as the corner parts between the vertical walls 11b, 11b and the upper walls 11c, 11c of the lower rail 11 and the corner parts between the vertical walls 11b, 11b and the bottom wall 11a of the lower rail 11 but at positions therebetween where rigidity is low. Further, the second ball members 143, 143, 153, 153 connect with the first ball members 142, 142, 152, 152 through the retainers 141, 141, 151, 151 having a substantially L-shaped cross section.

Accordingly, when a load is applied from any of the up and down directions and the lateral directions by the weight, a posture change, or the like of the person to try to deform the vertical walls 11b, 11b of the lower rail 11 and the vertical walls 12d, 12d of the upper rail 12 outward or in the opposite direction, the front retainers 141, 141 and the rear retainers 151, 151 which both have a substantially L-shaped cross section is configured such that the second retaining walls 1412, 1412, 1512, 1512 bend relative to the first retaining walls 1411, 1411, 1511, 1511 with the first ball members 142, 142, 152, 152 being fulcrums, and thus have high followability to the deformation of the lower rail 11 and the upper rail 12. Consequently, as the lower rail 11 and the upper rail 12 bend, the first ball members 142, 142, 152, 152 and the second ball members 143, 143, 153, 153 change in their positions to keep in contact with the lower rail 11 and the upper rail 12. As a result, rattling is reduced, abnormal noise is also reduced, and slidability of the upper rail 12 on the lower rail 11 is less reduced.

As described above, the sliding resistance reducing members 14, 15 of this embodiment have high followability to the deformation of the lower rail 11 and the upper rail 12 caused by a load, and have high effects of reducing rattling, reducing abnormal noise, and making slidability less reduced, and accordingly, there is a larger tolerance for the deformation of the lower rail 11 and the upper rail 12 than conventionally. This allows the material of the lower rail 11 and the upper rail 12 to be thinner even if the same material is used, to contribute to a weight reduction of the seat slide adjuster 10.

In FIG. 4 and FIG. 5, reference sign 16 denotes the locking mechanism. This locking mechanism 16 includes the release lever 161 and a lock member 162. The release lever 161 has a predetermined length and is disposed on the inner side of the lower rail 11 and the upper rail 12. The release lever 161 has a front end part 161a projecting from a front end of the upper rail 12, and the aforesaid slide lever 17 operated by a person is connected to the front end part 161a. In the release lever 161, when the front end part 161a is displaced up or down on the longitudinal-direction middle, its rear end part 161b is displaced in the opposite direction. The lower rail 11 includes mating engagement parts 11e (in this embodiment, constituted by a plurality of projecting pieces in a comb-teeth shape provided in the inner walls 11d, 11d), and in the configuration that the lock member 162 including an engagement part 162b (in this embodiment, constituted by holes in which the projecting pieces are inserted) engageable with the mating engagement part 11e is linked to the rear end part, lifting up the slide lever 17 to displace the front end part 161a of the release lever 161 in the upward direction causes the engagement part 162b of the lock member 162 to come off the mating engagement part 11e to produce an unlocked state, allowing the forward/rearward sliding movement. The displacement of the release lever 161 in the opposite direction causes the engagement part 162b to engage with the mating engagement part 11e to produce a locked state, and this opposite-direction movement is caused by the elastic force of a leaf spring member 163 biasing the release lever 161 in the engagement direction.

To enable such an operation of the release lever 161, it is pivotally supported at its longitudinal-direction middle by the upper rail 12. Specifically, the release lever 16 has, in its longitudinal-direction middle, a protrusion 161c engageable with a hole 12a1 formed in the upper wall 12a of the upper rail 12. Further, the leaf spring member 163 is disposed between an upper surface 161d of the release lever 161 and the upper wall 12a of the upper rail 12 to cover the protrusion 161c. The leaf spring member 163 has a base part 163a covering the protrusion 161c and disposed in the hole 12a1 together with the protrusion 161c. The leaf spring 163 further has two acting pieces 163b, 163c extending rearward from the base part 163a. The two acting pieces 163b, 163c are inserted into the release lever 161 through a through-hole 161g formed at the back of the protrusion 161c of the release lever 161. Consequently, the spring force of the leaf spring member 163 acts in such a direction as to displace the acting pieces 163b, 163c upward with respect to the base part 163a disposed in the hole 12a1. The acting piece 163b is engaged with an engagement hole 161f formed in the rear end part 161b of the release lever 161, and the other acting piece 163c is engaged with a connection hole 162d formed in a plate part 162a of the lock member 162. Consequently, the rear end part 161b of the release lever 161 and the lock member 162 are constantly biased upward, and the engagement part 162b of the lock member 162 is constantly biased in such a direction as to engage with the mating engagement part 11e of the lower frame 11.

Therefore, when an operator displaces the slide lever 17 upward, the front end part 161a of the release lever 161 connected to the slide lever 17 is displaced upward and the engagement part 162b comes off the mating engagement part 11e against the elastic force of the leaf spring member 163. On the other hand, when the operator takes his/her hand off the slide lever 17, the engagement part 162b engages with the mating engagement part 11e owing to the elastic force of the leaf spring member 163, resulting in the locking.

The lock member 162 has a shaft part 162c at one end in terms of the width direction (the same direction as the width direction of the lower rail 11 and the upper rail 12) and at the other end, has the substantially rectangular plate part 162a having the aforesaid engagement part 162b. In the vertical walls 12d of the upper rail 12 and the sidewalls 12b adjacent thereto, insertion holes 12e to which the plate part 162a is insertable are formed (note that the insertion hole 12e is formed on each side, but FIG. 4 illustrates only that on one side, and the similar insertion hole 12e is formed on the side where the lock member 162 is illustrated). The lock member 162 is inserted into the insertion holes 12e with the engagement part 162b being a leading end, and is disposed with the shaft part 162c supported by a bearing part provided in the vertical wall 12d. Consequently, the plate part 162a of the lock member 162 pivots up and down on the shaft part 162c, and the engagement part 162b constituted by the holes engages/disengages with/from the mating engagement part 11e of the lower frame 11.

Next, the slide lever 17 used in this embodiment will be described. As illustrated in FIG. 1 and FIG. 2, the slide lever 17 has: an operation part 171 provided below the front edge of the seat cushion frame S1 and extending in the lateral direction between the pair of left and right seat slide adjusters 10, 10 included in the seat sliding device 1; and connecting end parts 172, 172 bent downward at a substantially right angle near ends of the operation part 171, further bent rearward at a substantially right angle, and extending in the longitudinal direction of the lower rail 11 and the upper rail 12. The connecting end parts 172, 172 have a closed ring-shaped cross section. Through the connecting end parts 172, 172, the front end parts 161a of the release levers 161 are connected.

Figure 6:
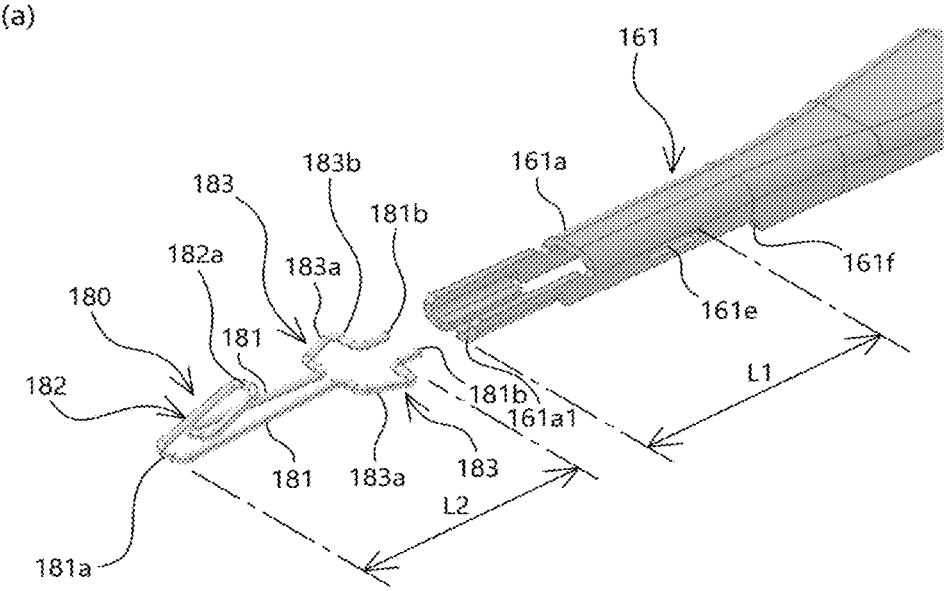
FIG. 6(a) is a perspective view illustrating a connection spring member and a front end part of a release lever in a connecting structure between a connecting end part of the slide lever and the front end part of the release lever.
FIG. 6(b) is an explanatory perspective view of a process of connecting the slide lever to the release lever to which the connection spring member has been attached.
Figure 6:
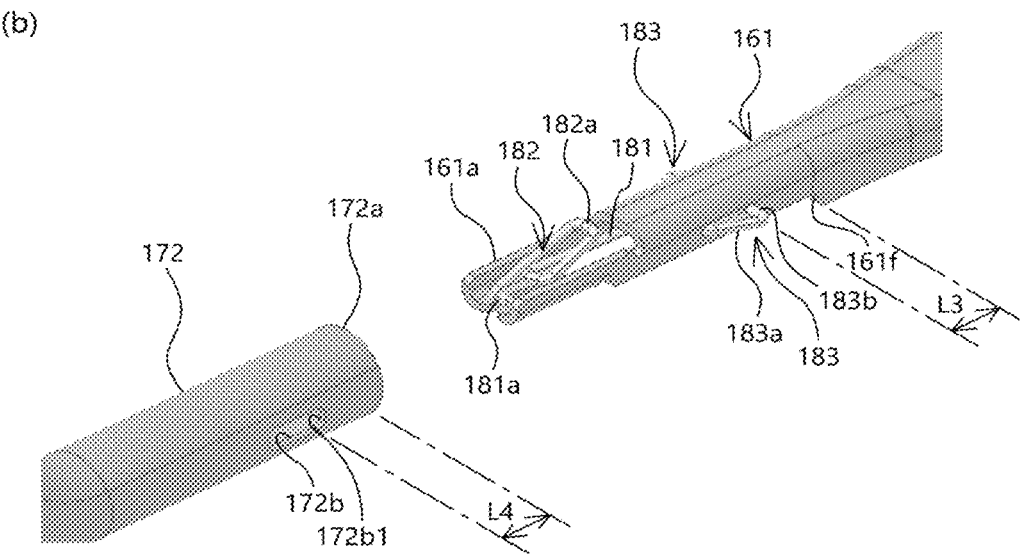

In this embodiment, the release lever 161 and the slide lever 17 are connected with a connection spring member 180 therebetween. The connection spring member 180 is formed of a wire material for springs such as a piano wire or a hard-drawn steel wire worked into a predetermined shape. Specifically, as illustrated in FIG. 4 and FIGS. 6, the connection spring member 180 has two wire parts 181, 181 formed of one wire material bent near the middle, and on a bent end 181a side of the two wire parts 181, 181, a front lock part 182 including the bent end 181a as its one side and worked into a substantially rectangular shape in a plan view is formed. The front lock part 182 obliquely rises in such a direction as to be more apart from the two wire parts 181, 181 as it goes toward an acting end 182a which is a side opposite to the bent end 181a. Further, on rear end parts 181b, 181b sides of the two wire parts 181, 181, protruding engagement parts 183, 183 are formed whose middle portions bulge outward in a substantially C-shape in a plan view. The protruding engagement parts 183, 183 have the substantially C-shape, but more correctly, they are shaped to have oblique sides 183a, 183a that become more outward as they go rearward along the longitudinal direction and also have rear sides 183b, 183b that meet with the rear ends of the oblique sides 183a, 183a and lines along the two wire parts 181, 181 at a substantially right angle. Consequently, when the acting end 182a of the front lock part 182 is pressed in such a direction as to approach the wire parts 181, 181, restoring force acts in such a direction as to cause the acting end 182a to separate from the wire parts 181, 181, and when the two wire parts 181, 181 are made to approach each other, restoring force acts in such a direction as to cause them to separate from each other.

The vicinity of the front end part 161a of the release lever 161 has a substantially semi-tubular shape, and in its side surface at a position apart from an open end 161a1 of the front end part 161a by a predetermined length along the longitudinal direction (the length L1 indicated in FIG. 6(a) (length substantially corresponding to the distance L2 from the bent end 181a of the connection spring member 180 to the position where the rear sides 183b, 183b of the protruding engagement parts 183, 183 are formed)), engagement protrusion holes 161e, 161e are formed. Since the oblique sides 183a, 183a of the protruding engagement parts 183, 183 have a predetermined length in the longitudinal direction, the engagement protrusion holes 161e, 161e have a long hole shape with a length corresponding to the aforesaid predetermined length.

The connecting end parts 172, 172 of the slide lever 17 each have, in a side surface, engagement holes 172b, 172b at a rearward position apart from an open end 172a by a predetermined length (the length L4 in FIG. 6(b)). The front end part 161a of the release lever 161 is inserted into the connecting end part 172, and at this time, the open end 172a of the connecting end part 172 abuts on a stopper 161f which is protrudingly formed on the side surface of the release lever 161 at a position apart rearward from the engagement protrusion holes 161e, 161e by a predetermined length along the longitudinal direction (the length L3 in FIG. 6(b) (corresponding to the length L4)). Accordingly, the engagement protrusion holes 161e, 161e and the engagement holes 172b, 172b are aligned with each other when the front end part 161a is inserted until the open end 172a of the connecting end part 172 abuts on the stopper 161f.

As described above, to connect the slide lever 17 and the release lever 161, the two wire parts 181, 181 of the connection spring member 180 are first inserted into the semi-tubular front end part 161a of the release lever 161 with the rear end parts 181b, 181b being leading sides. At the time of this insertion, the two wire parts 181, 181 are made to approach each other. Consequently, when the protruding engagement parts 183, 183 reach the position of the engagement protrusion holes 161e, 161e of the release lever 161, the wire parts 181, 181 move away from each other owing to their restoring force to protrude outward from the engagement protrusion holes 161e, 161e. As a result, the bent end 181a of the connection spring member 180 is located near the open end 161a1 of the front end part 161a of the release lever 161 as illustrated in FIG. 6(b).

In the state in which the connection spring member 180 is thus attached to the release lever 161 in advance, the connecting end part 172 of the slide lever 17 is fitted on the outer side of the front end part 161a of the release lever 161. When the open end 172a of the connecting end part 172 of the slide lever 17 abuts on the stopper 161f of the release lever 161, the protruding engagement parts 183, 183 of the connection spring member 180 protruding from the engagement protrusion holes 161e, 161e of the release lever 161 engage with the engagement holes 172b, 172b of the connecting end part 172 of the slide lever 17. Since the rear sides 183b, 183b of the protruding engagement parts 183, 183 rise at a substantially right angle to the lines along the shaft parts 181, 181, the rear sides 183b, 183b engage with thickness portions of rear edges 172b1, 172b1 of the engagement holes 172b, 172b at a substantially right angle. Consequently, without an operation of pushing the protruding engagement parts 183, 183, the connected slide lever 17 cannot be removed only by being pulled forward. Then, rattling especially in the left-right direction of the front end part 161 of the release lever 161 in the connecting end part 172 of the slide lever 17 is reduced owing to the elastic force of the shaft parts 181, 181 in the separating direction.

Further, when the release lever 161 is inserted into the connecting end part 172, the acting end 182a of the front lock part 182 receives force in such a direction as to be pressed toward the wire parts 181, 181, so that the restoring force of the front lock part 182 works in such a direction as to cause the acting end 182a to pivot up on the bent end 181a, to press the inner surface of the connecting end part 172. This reduces the rattling of the release lever 161 especially in the up-down direction in the connecting end part 172. Further, the bent end 181a of the connection spring member 180 has a thickness only corresponding to the thickness of the single wire part 181, but since the front lock part 182 is inclined so as to be gradually separate from the wire parts 181, 181 as it goes more rearward from the bent end 181a, the insertion of the front end part 161a of the release lever 161 into the open end 172a of the connecting end part 172 is very easy.

In the above-described manner, the left and right connecting end parts 172, 172 of the slide lever 17 are connected to the front end parts 161a, 161a of the left and right release levers 161, 161, and being connected with the connection spring members 180 therebetween, they can be easily connected only by the insertion. In addition, the connection spring member 180 is formed of the worked wire material for springs, the protruding engagement parts 183, 183 engage with both the front end parts 161a, 161a of the release lever 161 and the connecting end part 172 of the slide lever 17 through the engagement protrusion holes 161e, 161e and the engagement holes 172b, 172b, and the front lock part 182 provided at the position the predetermined distance apart from the protruding engagement parts 183, 183 presses the inner surface of the connecting end part 172. This reduces the rattling of the release levers 161, 161 in the connecting end parts 172, 172 of the slide lever 17 in any of the up, down, left, and right directions.

Further, the connection spring member 180 is disposed without the shaft parts 181, 181 from the protruding engagement parts 183, 183 up to the front lock part 182 being fixed to any place. Therefore, elastic force corresponding to the separation distance between the protruding engagement parts 183, 183 and the front lock part 182 is exhibited. Specifically, if the middle portions of the shaft parts 181, 181 are fixed to some places, a practical spring constant is higher than in the case they are not fixed, but in this embodiment, this is not the case. Accordingly, vibration accompanying an impact caused by the engagement of the engagement hole 162b of the lock plate 162 with the mating engagement part 11e of the lower rail 11 is absorbed, and abnormal noise due to the impact is also reduced.

Figure 7:
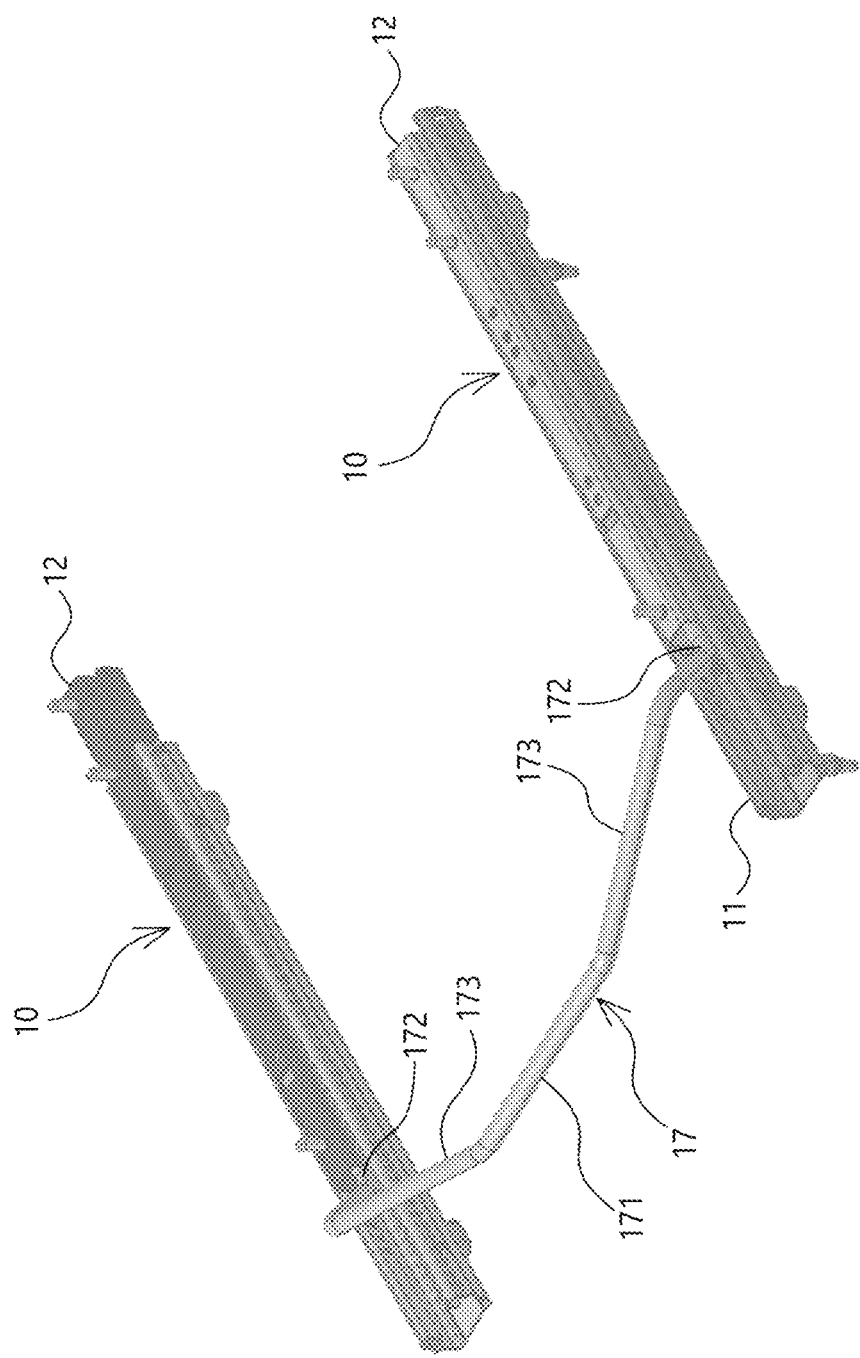
FIG. 7 is an explanatory view of another mode of the slide lever.

It should be noted that the present invention is not limited to the above-described embodiment. What is essential in the present invention is that the connecting structure between the connecting end part of the slide lever and the front end part of the release lever uses the above-described connection spring member, and the detailed structure of the locking mechanism, the structures of the lower rail and the upper rail, and the structures of the sliding resistance reducing members and so on which are described above are merely examples. Further, the shape of the slide lever is not limited either. For example, as illustrated in FIG. 7, it is also possible to use a slide lever 17 whose operation part 171 has a shorter lateral-direction length than in the type illustrated in FIG. 1 and FIG. 2, and in which the operation part 171 and connecting end parts 172, 172 are connected by oblique sides 173, 173 that extend rearward toward the connecting end parts 172, 172. This slide lever 17 is shaped such that its range protruding more forward than the front edge of the seat cushion frame S1 is narrow, that is, the range of the oblique sides 173, 173 is closer to the front edge of the seat cushion frame S1. This structure reduces a possibility that the slide lever 17 comes into contact with the legs of the person at the time of impact or the like. Note that the connecting structure between the connecting end parts 172, 172 and the release levers 161, 161 is completely the same as above.

INDUSTRIAL APPLICABILITY

The present invention is suitably used in automobiles as described in the to above embodiment but is also applicable to seats of various vehicles such as airplanes, trains, ships, and buses.

EXPLANATION OF REFERENCE SIGNS

1 seat sliding device
10 seat slide adjuster
11 lower rail
11e mating engagement part
12 upper rail
14 sliding resistance reducing member (front sliding resistance reducing member)
141 retainer (front retainer)
142 first ball member
143 second ball member
15 sliding resistance reducing member (rear sliding resistance reducing member)
151 retainer (rear retainer)
152 first ball member
153 second ball member
16 locking mechanism
161 release lever
161a front end part
161e engagement protrusion hole
162 lock plate
162b engagement hole
17 slide lever
171 operation part
172 connecting end part
172a open end
172b engagement hole
180 connection spring member
181 wire part
181a bent end
181b rear end part
182 front lock part
182a acting end
183 protruding engagement part

The invention claimed is:

1. A seat sliding device comprising:
a lower rail;
an upper rail slidably provided on the lower rail and connected to a seat frame;
a locking mechanism including a lock plate for locking the upper rail at a predetermined position of the lower rail, a locking spring member which biases the lock plate in a locking direction, and a release lever which operates the lock plate in an unlocking direction; and
a slide lever for operation connected to a front end part of the release lever,
wherein the slide lever has a connecting end part in a tubular shape, and the front end part of the release lever is inserted in the connecting end part with a connection spring member therebetween,
wherein the connection spring member is formed of a worked wire material for springs, is bent in the middle, and includes:
a bent end located forward;
two wire parts extending rearward from the bent end and biased in such a direction as to separate from each other;
protruding engagement parts which are formed to protrude outward in the respective two wire parts at positions a predetermined distance apart from the bent end and, in a state in which the two wire parts are inserted in the front end part of the release lever, protrude outward from engagement protrusion holes formed in the front end part at opposed positions; and a front lock part provided on the bent end side and having an acting end biased in such a direction as to be apart from the two wire parts, and wherein the connecting end part of the slide lever has engagement holes formed at opposed positions, and is fitted on an outer side of the front end part of the release lever while the protruding engagement parts of the connection spring member protruding from the engagement protrusion holes of the front end part of the release lever engage with the engagement holes and an inner surface of the connecting end part is pressed by elastic force of the acting end of the front lock part of the connection spring member.

2. The seat sliding device according to claim 1, wherein the front lock part has a substantially rectangular shape whose sides include the bent end and whose side opposite the bent end is the acting end, and is more apart from the two wire parts as the front lock part goes from the bent end toward the acting end.

3. A slide lever connecting structure for connecting a slide lever to a release lever in a seat sliding device, the seat sliding device including: a lower rail; an upper rail slidably provided on the lower rail and connected to a seat frame; a locking mechanism including a lock plate for locking the upper rail at a predetermined position of the lower rail, a locking spring member which biases the lock plate in a locking direction, and the release lever which operates the lock plate in an unlocking direction; and the slide lever for operation connected to a front end part of the release lever, wherein the slide lever has a connecting end part in a tubular shape, and the front end part of the release lever is inserted in the connecting end part with a connection spring member therebetween, wherein the connection spring member is formed of a worked wire material for springs, is bent in the middle, and includes:

a bent end located forward;

two wire parts extending rearward from the bent end and biased in such a direction as to separate from each other;

protruding engagement parts which are formed to protrude outward in the respective two wire parts at positions a predetermined distance apart from the bent end and, in a state in which the two wire parts are inserted in the front end part of the release lever, protrude outward from engagement protrusion holes formed in the front end part at opposed positions; and a front lock part provided on the bent end side and having an acting end biased in such a direction as to be apart from the two wire parts, and wherein the connecting end part of the slide lever has engagement holes formed at opposed positions, and is fitted on an outer side of the front end part of the release lever while the protruding engagement parts of the connection spring member protruding from the engagement protrusion holes of the front end part of the release lever engage with the engagement holes and an inner surface of the connecting end part is pressed by elastic force of the acting end of the front lock part of the connection spring member.

4. The slide lever connecting structure in the seat sliding device according to claim 3, wherein the front lock part has a substantially rectangular shape whose sides include the bent end and whose side opposite the bent end is the acting end, and is more apart from the two wire parts as the front lock part goes from the bent end toward the acting end.

* * * * *